Feb. 3, 1931. J. L. SKUTTLE 1,791,385
PIPE TAP
Filed Oct. 21, 1927
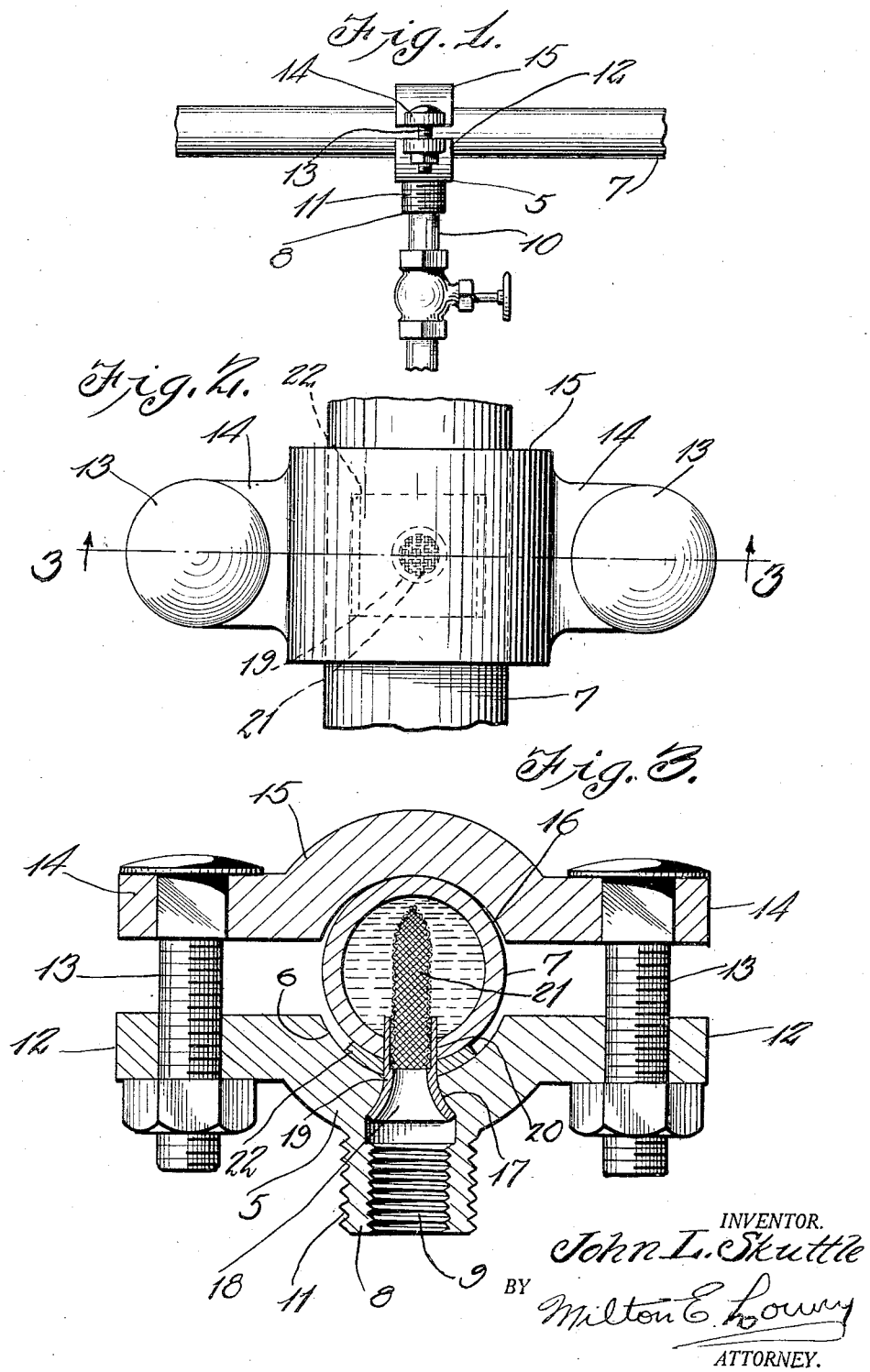

Patented Feb. 3, 1931

1,791,385

UNITED STATES PATENT OFFICE

JOHN L. SKUTTLE, OF MASON CITY, IOWA

PIPE TAP

Application filed October 21, 1927. Serial No. 227,780.

This invention relates to improvements in pipe taps that are adapted to make a branch connection between two pipes without cutting or threading the main pipe.

The primary object of the present invention is to provide a tap of the above kind with a strainer of improved construction, whereby obstructive materials which may find their way into the main pipe are prevented from entering the branch pipe and choking it up and whereby all danger of such obstructions accumulating around the strainer itself and preventing the water entering the supply pipe, is obviated.

A further object is to provide a pipe fitting or tap that is inexpensive to manufacture, simple in construction, efficient in operation, not liable to leak, and capable of being quickly and easily installed.

Other objects will appear as the nature of the invention is better understood, and the same consists in the novel form, combination and arrangement of parts hereinafter more fully described, shown in the accompanying drawing and claimed.

In the drawings, wherein like reference characters indicate corresponding parts throughout the several views, Figure 1 is a fragmentary side elevational view showing a branch pipe connected with a main pipe by means of a pipe tap constructed in accordance with the present invention;

Figure 2 is an enlarged fragmentary top plan view of the device shown in Figure 1; and Figure 3 is a transverse section on line 3—3 of Figure 2.

Referring more in detail to the drawing, the present invention comprises a fitting member 5 that is provided with a curved recess as at 6 adapted to substantially fit the curved circumference of the main pipe 7. The fitting member 5 has a tubular shank 8 that is internally threaded as at 9 for direct connection with a branch pipe 10, and externally threaded as at 11 to permit connection with the branch pipe 10 by means of an internally threaded coupling member when found necessary or desirable. The fitting member 5 is provided with opposite outwardly projecting perforated flanges or ears 12 that are adapted to be connected by bolts or screws 13 with similar flanges or ears 14 on a clamp member 15 which also has a curved recess 16 to substantially fit the curved circumference of the main pipe 7.

The tubular shank 8 of the fitting member 5 has the inner end of the bore thereof tapered smaller in an inward direction to form a tapered seat 17 outwardly against which is flared, as at 18, the outer end of a tubular imperforate strainer body 19 that is preferably formed of relative soft malleable metal, such as copper. The strainer body 19 projects a material distance inwardly of the recess 6 and is adapted to snugly fit in and project inwardly through an opening or hole 20 that is drilled in the side of the main pipe 7. An elongated tubular strainer member 21 has one end suitably fitted and secured to, and preferably in, the strainer body 19, and this strainer member 21 is preferably formed of wire gauze as shown, with its inner end closed and its outer end opened for communication with the bore of the strainer member 19.

As shown clearly in Figure 3, the strainer member 21 is adapted to project a material distance into and at right angles to the axis of the main pipe 7. Thus, when the water is not passing into the branch pipe 10, it will flow through the openings of the strainer member 21 in a line with the main pipe 7, and by its force, wash away any obstructive substance that may come against the strainer member 21. On the other hand, when the water is flowing into the branch pipe 10, any foreign matter which may be carried with the water will be stopped by the strainer member 21 and prevented from entering the branch pipe 10.

In installing the device, a packing member of malleable metal or the like is interposed as at 22 between the main pipe 7 and the fitting member 5, the packing member 22 having a central opening so that it may snugly fit over the strainer body 19. The device is securely clamped on the pipe 7, and a drill is inserted through the bore in the tubular shank 8 so that the holes may be drilled in the packing member 22 and pipe 7 for establishing communication between the main pipe 7 and the tubular shank 8. The strainer is then inserted in the bore of the shank 8 and its outer end flared as at 18, into snug engagement with the seat 17. As the tubular body 19 of the strainer is of such size as to require forcing of the same through the holes of the packing member 22 and pipe 7, it will fit in place with sufficient friction to not be displaced by the water pressure thereagainst.

From the foregoing description, the advantages of the construction will be readily apparent to those skilled in the art.

Minor changes may be made without departing from the spirit and scope of the invention as claimed.

What I claim as new is:—

In a pipe tap, a fitting member formed to substantially fit the curved circumference of a main pipe and provided with a tubular shank for connection with a branch pipe, a clamp member formed to substantially fit the curved circumference of the main pipe, an imperforate tubular member mounted in the tubular shank and projecting inwardly of the fitting member for passing through a hole in the side of the main pipe, said tubular member being swaged outwardly at its outer end into engagement with the tubular shank, a strainer including a perforate hollow member capable of passing through the hole in the main pipe and carried by and projecting inwardly from the imperforate tubular member for extending transversely of the main pipe within the bore of the latter, and means for removably securing the fitting and clamp members together against opposite side faces of the main pipe, said fitting member being wholly external of the main pipe in the assembly, the tubular member being free from engagement with the main pipe, said tubular shank having the inner end of the bore thereof tapered smaller in an inward direction, said imperforate strainer member being of relatively soft malleable metal and having its outer end expanded into contact with the wall of said tapered bore portion of the shank.

In testimony whereof I affix my signature.

JOHN L. SKUTTLE.